United States Patent [19]
Hayashi et al.

[11] Patent Number: 4,691,351
[45] Date of Patent: Sep. 1, 1987

[54] TELEVISION SIGNAL RECEIVING APPARATUS

[75] Inventors: Toshihide Hayashi, Tokyo; Ikuo Kanayama, Kanagawa; Masayoshi Kanno, Tokyo, all of Japan

[73] Assignee: Sony Corporation, Tokyo, Japan

[21] Appl. No.: 803,017

[22] Filed: Nov. 29, 1985

[30] Foreign Application Priority Data

Nov. 29, 1984 [JP] Japan .............................. 59-252142
Dec. 3, 1984 [JP] Japan .............................. 59-255495

[51] Int. Cl.⁴ ........................................... H04N 7/167
[52] U.S. Cl. ..................................... 380/10; 358/349; 358/142; 358/84; 380/20
[58] Field of Search ................... 358/86, 84, 142, 144, 358/121, 122, 123, 115, 116, 349; 380/10, 20

[56] References Cited

U.S. PATENT DOCUMENTS 2,875,270  2/1959  Wendt et al. ...................... 358/116
4,287,597  9/1981  Paynter et al. ..................... 455/51
4,484,217  11/1984 Block et al. ........................ 358/86
4,531,021  7/1985  Bluestein et al. .................. 358/122
4,536,791  8/1985  Campbell et al. .................. 358/122

FOREIGN PATENT DOCUMENTS 0144770  6/1985  European Pat. Off. ............. 358/86

Primary Examiner—Stephen C. Buczinski
Attorney, Agent, or Firm—Hill, Van Santen, Steadman & Simpson

[57] ABSTRACT

A television signal receiving apparatus is provided having a program schedule display function. The apparatus includes a tuner, a television signal processing circuit connected to the tuner, a digital signal processing circuit connected to the tuner for generating a program schedule display signal based on program schedule data obtained through the tuner, and a switch connected to the digital signal processing circuit for selectively generating a local program schedule display signal based on the Standard Time selected by the switch.

7 Claims, 5 Drawing Figures

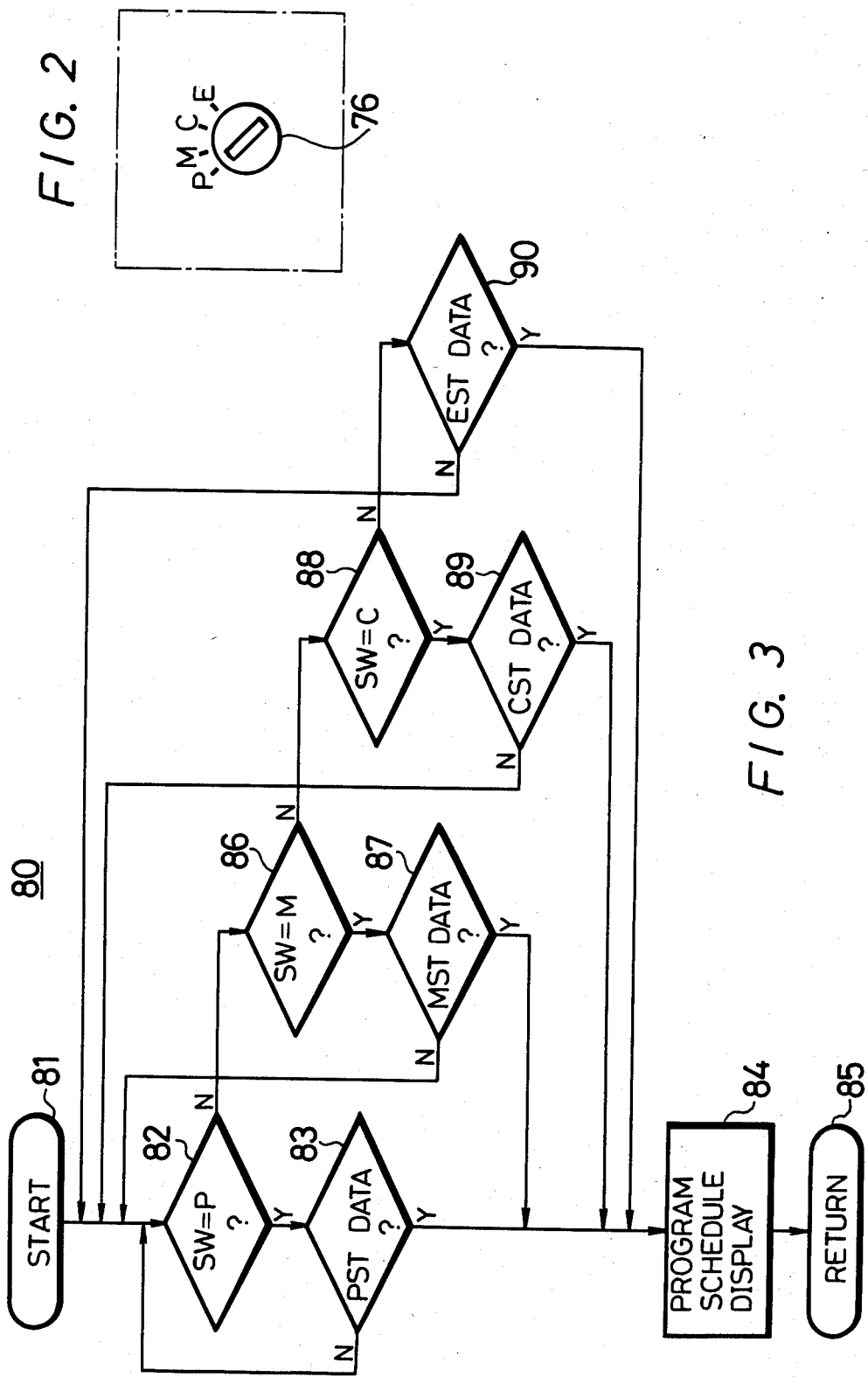

TELEVISION SIGNAL RECEIVING APPARATUS

BACKGROUND OF THE INVENTION

This invention generally relates to a television signal receiving apparatus and more particularly is directed to a television signal receiving apparatus for receiving a satellite broadcasting signal, CATV signals, or the like which has wide service areas having different Time Standards.

In a DBS (Direct Broadcast Satellite) system, a video signal and an audio signal are multiplexed with other data and then transmitted, while program schedule data is transmitted as a part of such data. That is, while the satellite broadcasting is performed for a certain channel, the program schedule of such a channel is also transmitted by code through the same channel.

Accordingly, in the DBS system, the viewer can see the program schedule without using other media, such as a newspaper and a magazine.

Furthermore, according to the DBS system, the broadcasting service can be made available for a large number of areas by a single broadcast satellite. For example, the entire area of the United States of America can be covered by a single broadcast satellite.

However, there are four Standard Times (areas having a difference in time), for example, the PST (Pacific Standard Time), MST (Mountain Standard Time), the CST (Central Standard Time), and the EST (Eastern Standard Time) in the U.S.A.

Accordingly, if the satellite broadcasting transmits a program schedule of, for example, CST, the viewers living outside the CST area or time zone must change the time on the program schedule to the standard time of the area where they live. If the viewer makes a mistake in calculating an equivalent time, the viewer may miss the desired television program. In addition, this defect becomes serious because the satellite broadcast is usually a pay program service.

SUMMARY OF THE INVENTION

Accordingly, it is an object of this invention to provide a television signal receiving apparatus which can prevent a viewer from losing a chance to see a desired television program.

It is another object of this invention to provide a television signal receiving apparatus which can be simplified in construction.

It is a further object of this invention to provide a television signal receiving apparatus which is suitable for use in a satellite broadcast, a CATV, and the like.

According to one aspect of the present invention, there is provided a television signal receiving apparatus having a program schedule display function comprising:

(a) tuner means;

(b) television signal processing means connected to said tuner means;

(c) digital signal processing means connected to said tuner means for generating a program schedule display signal based on a program schedule data obtained through said tuner means; and (d) switch means connected to said digital signal processing means for selectively generating a local program schedule display signal based on the Standard Time selected by said switch means.

These and other objects, features and advantages of the present invention will become apparent from the following detailed description of the preferred embodiments taken in conjunction with the accompanying drawings, throughout which like references designate the same elements and parts.

BRIEF DESCRIPTION OF THE DRAWINGS

FIG. 2 is a diagram showing an example of a switch used in the present invention;

FIG. 3 is a flow chart useful for explaining the operation of the television signal receiving apparatus of this invention shown in FIG. 1;

DESCRIPTION OF THE PREFERRED EMBODIMENTS

Now, an embodiment of a television signal receiving apparatus according to this invention will be described with reference to the attached drawings.

Figure 1:
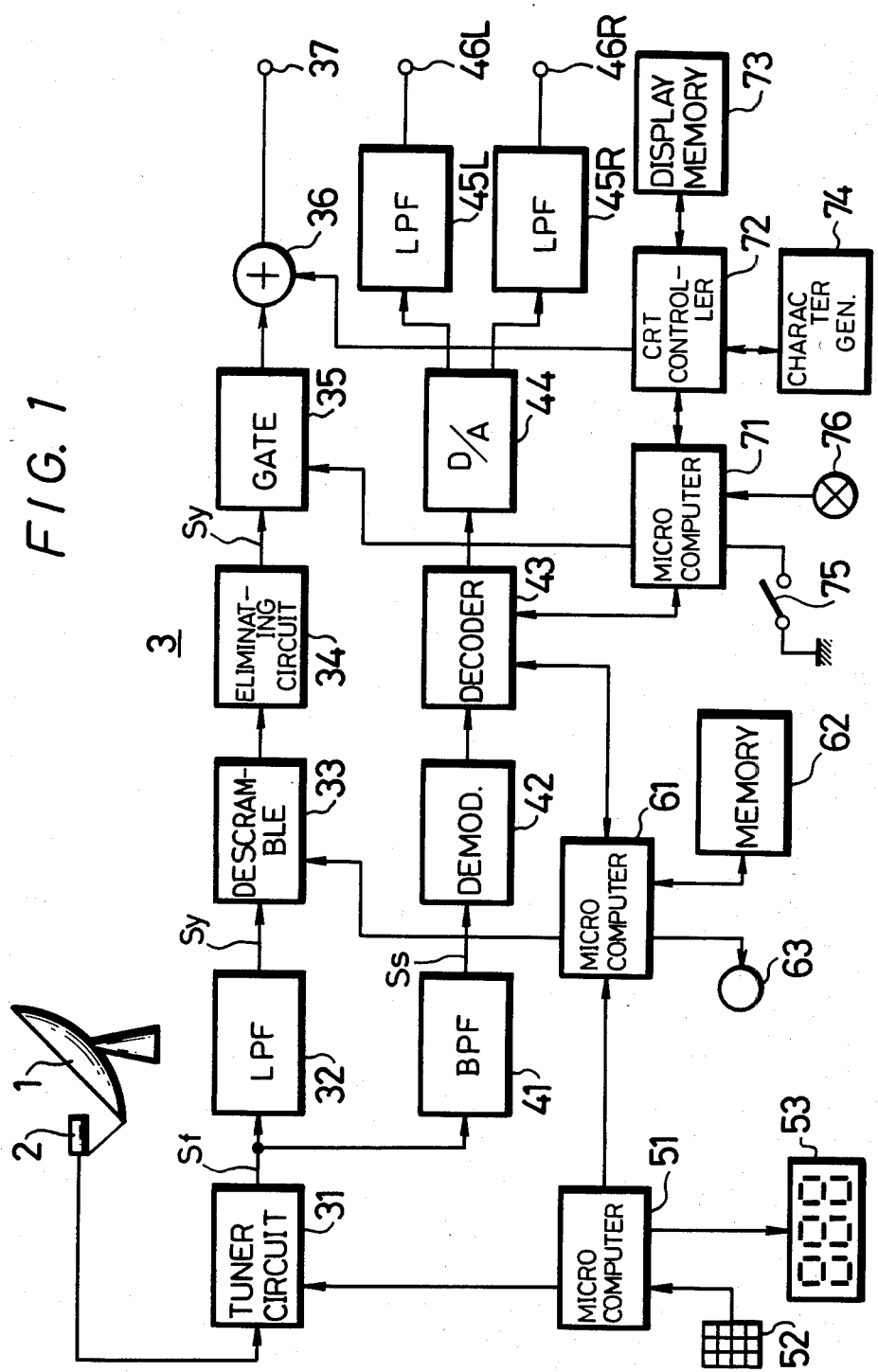
FIG. 1 is a circuit block diagram showing an embodiment of a television signal receiving apparatus according to this invention.

FIG. 1 is a block diagram schematically showing an embodiment of the television signal receiving apparatus according to this invention.

Referring to FIG. 1, the broadcast wave from a broadcast satellite (not shown) is received by a parabola antenna (BS antenna) 1. The received signal is frequency-converted to a signal in the 1 GHz band by an outdoor unit (BS converter) 2 and the frequency-converted signal is then supplied to an indoor unit (BS tuner) 3.

In the indoor unit 3, the signal from the outdoor unit 2 is first supplied to a tuner circuit 31. A channel-selection signal is supplied from a tuning microcomputer 51 for selecting a channel to the tuner circuit 31, then the tuner circuit 31 selects a channel that the viewer wants to receive. Then, a signal Sf which is a frequency-multiplexed signal of a video signal Sy, and a modulated code signal Ss, is produced from the signal of the selected channel. In this case, the video signal Sy is the video signal of a base band in which the signal scramble is carried out. The modulated code signal Ss is the modulated signal which results from 4-phase DPSK (Differential Phase-Shift Keying) - modulating a sub-carrier with a frequency of 5.3 MHz by the audio signal and the data signal. The audio signal thereof is the digital signal (PCM signal) which is pulse-code-modulated by a PCM encoder, and the data signal thereof is the digital signal also. Furthermore, the data signal contains data of, for example, four kinds of program schedules and the data are each added with an identification code ID which indicates one of the PST, MST, CST, and EST program schedules. In FIG. 1, reference numeral 52 designates ten keys used to input the numeral of the television channel upon channel selection, and reference numeral 53 designates an LED (Light Emission Diode) which displays the number of the selected channel.

The signal Sf from the tuner circuit 31 is supplied to a low-pass filter 32 which produces the scrambled video signal Sy. This scrambled video signal Sy is supplied to a de-scramble circuit 33 in which it is de-scrambled. Then, the video signal thus de-scrambled is supplied to an eliminating circuit 34 which eliminates an energy diffusing signal from the descrambled video signal Sy. The signal Sy, whose energy diffusing component is removed, is supplied through a gate circuit 35 and a mixing circuit 36 to a terminal 37.

The signal Sf is also supplied to a band-pass filter 41 which produces the signal Ss. This signal Ss is supplied to a demodulating circuit 42 which then demodulates a PCM signal (digital audio signal) and the data signal. The demodulated signal is supplied to a decoder 43 in which the error correction, the separation of various signals, and the like are carried out. Then, the PCM signal is supplied to a D/A (digital-to-analog) converter 44 which converts it to the stereo left and right audio signals. These audio signals are supplied through low-pass filters 45L and 45R to terminals 46L and 46R, respectively.

Furthermore, at that time, a part of the data signal is supplied from the decoder 43 to a microcomputer 61 for payment control. Namely, a signal indicative of the present receiving channel and the control signal are supplied from the microcomputer 51 to the microcomputer 61 so that the microcomputer 61 allows an advance payment memory 62 of the corresponding channel to be decreased in accordance with the reception contract and checks the balance of this advance payment memory 62. When the balance is decreased to the predetermined value, an alarm LED 63 flashes. If the balance of the advance payment memory 62 is reduced to zero, the control signal is supplied from the microcomputer 61 to the de-scramble circuit 33, whereby the descramble operation can be inhibited and thus the viewer can no longer substantially see the television program of In practice, the advance payment memory 62 is made of a non-volatile memory and the data stored therein indicates the balance. When the viewer deposits the pay charge to the bank, the identification code which identifies the contract receiver and the control signal are transmitted as the data signals. On the basis of the identification code and the control signal, the advance payment memory 62 is set at a predetermined balance by the microcomputer 61 in the contract television receiver.

Furthermore, reference numeral 71 designates a microcomputer for indicating messages, such as a program schedule and so on. Since this microcomputer 71 is of such a type which displays the message in a so-called video RAM (Random Access Memory) system, this microcomputer 71 is connected through a CRT (cathode ray tube) controller 72 to a display memory 73 and a character generator 74. It is further connected with a non-lock type push switch 75 which turns on and off the display of the message, and a selection switch 76 which selects the program schedule in response to the Standard Time area. This selection switch 76 is formed as a switch of, for example, a rotary type having four switching positions P, M, C, and E corresponding to the PST, MST, CST, and EST program schedules as shown in FIG. 2. Also, this switch 76 can be selectively changed in position by the viewer in accordance with the Standard Time area. However, this switch 76 is changed in position only when the Standard Time area is changed so that it is provided in, for example, the pocket portion at the front of the unit 3, and this switch 76 can be changed in position by the coins and the like. In the case shown in FIG. 2, this television receiver is used in the PST Standard Time area so that the switch 76 is switched to the position P.

To the ROM (Read Only Memory) of the microcomputer 71, there is added a program routine 80 shown in FIG. 3 in addition to the message display program.

As shown in the flow chart of FIG. 3, when the switch 75 is turned ON, the program routine 80 begins with step 81. At step 82, it is checked whether or not the switching position of the switch 76 is at the position P. In the example of FIG. 2, since the switch 76 is changed in position to the contact P, the program of the microcomputer 74 goes to step 83. At step 83, of the data transmitted from the decoder 43, the identification code ID is used to check to see that the data of the PST program schedule is transmitted. When the data for the PST program schedule is obtained, the program goes to step 84 in which the processing for the display is carried out. Then, the data is sequentially written through the CRT controller 72 to the memory 73. When all the data are written in the memory 73, this program routine 80 ends with step 85.

At that time, the data for the PST program schedule written in the memory 73 is read out therefrom in a time division manner by the CRT controller 72 and converted to a video signal for program schedule by using the character generator 74. This signal is delivered through the mixing circuit 36 to the terminal 37. Furthermore, at that time, the control signal from the microcomputer 71 is supplied to the gate circuit 35, in which the video signal Sy from the eliminating circuit 34 is blanked.

Figure 4:
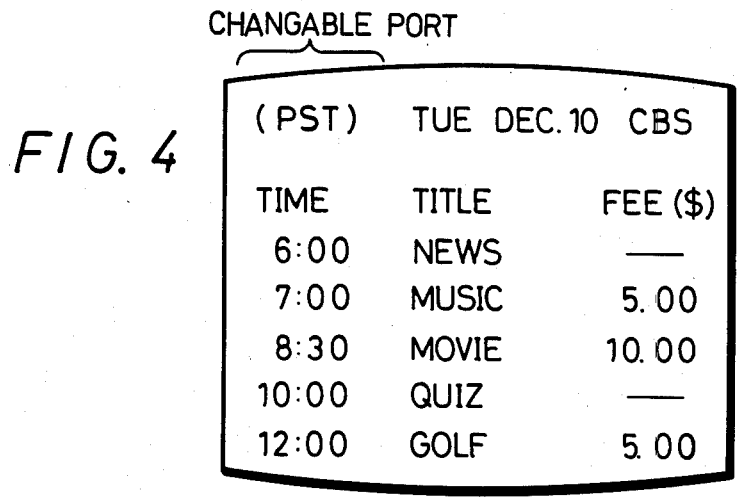
FIG. 4 is a diagram showing an example of a program schedule data displayed on the picture screen of the television receiver.

Accordingly, on the television receiver (not shown) connected to the terminal 37, there is displayed the PST program schedule as shown in FIG. 4.

If the switch 75 is turned on once again, the video signal for the program schedule from the CRT controller 72 is signal for the program schedule from the CRT controller 72 is blanked and the blanking of the video signal Sy in the gate circuit 35 is released and so the normal satellite broadcast is received (displayed).

Turning back to FIG. 3, when at step 82 it is judged that the switch 76 is not at the P position, the program goes to step 86 in which it is checked to see whether the switch 76 is at the M position or not. If the switch 76 is connected to the M position, the program goes to step 87 in which it is checked to see that the program schedule data for the MST is transmitted. Then, if the MST program schedule data is confirmed by the identification code ID, the program goes to the step 84 in which the data processing similar to that of PST program schedule data is carried out.

If the switch 76 is connected to the C position, the program schedule data can be processed similarly at steps 88 and 89.

If the switch 76 is connected to the E position, the switch position check routine is unnecessary and the program goes to step 90 to await the transmission of the EST program schedule directly.

As set forth above, according to the present invention, only by switching the switch 76 in response to the Standard Time area, can the program schedule data of the Standard Time area be displayed. Accordingly, it is possible to avoid the problem wherein the viewer will fail to see the desired television program because the viewer is given an incorrect broadcast time.

In this case, the circuit arrangement therefor can be made very simple by only adding the switch 76 and the program routine 80 which can be manufactured at low cost.

Figure 5:
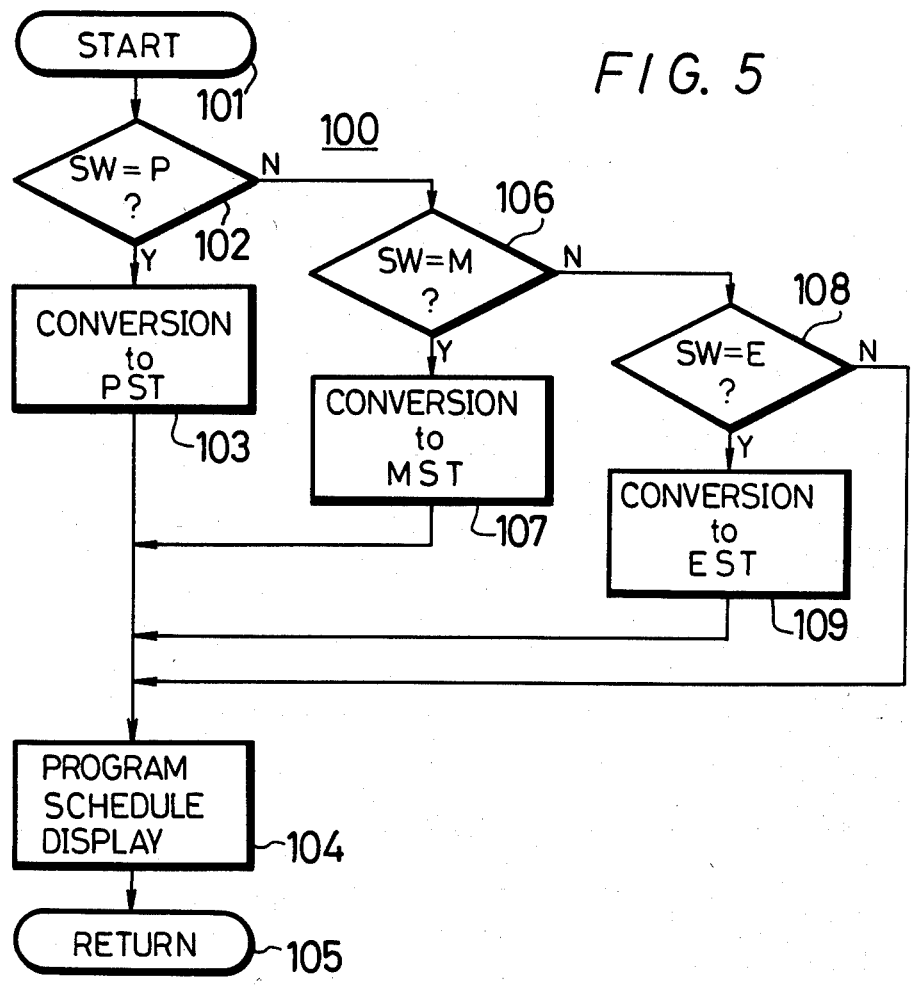
FIG. 5 is a flow chart useful for explaining the operation of another embodiment of the television signal receiving apparatus according to the present invention.

As another embodiment of the present invention, such a version is made possible in which, for example, the CST program schedule data is converted to program schedule data which is suitable for another Standard Time. In this case, instead of the program routine 80 shown in the flow chart of FIG. 3, a program routine 100 shown in FIG. 5 is used. The operation in this case will be described as follows.

When the switch 75 in FIG. 1 is turned on, a program routine 100 begins with step 101. In the next step 102, the switching position of the switch 76 is checked. If now the switch 76 is connected to the P position, the processing by the microcomputer 71 goes to step 103. At step 103, of the data transmitted from the decoder 43, the CST program schedule data is identified by the identification code ID and then derived. Then, with this data, the data indicative of the time is converted in accordance with a difference in time between the PST and the CST. The data thus converted is sequentially written through the CRT controller 72 to the memory 73 at step 104. When all the data are written in the memory 73, the program goes to step 105 and the routine 100 ends with the step 105. Accordingly, the PST program schedule data is written in the memory 73.

At that time, the PST program schedule data written in the memory 73 is read out therefrom in a time division manner by the CRT controller 72 and then converted to the video signal for the program schedule by using the character generator 74. This signal is supplied through the mixing circuit 36 to the terminal 37. Furthermore, at that time, the control signal from the microcomputer 71 is supplied to the gate circuit 35, whereby the video signal Sy from the eliminating circuit 34 is blanked.

Accordingly, on the television receiver (not shown) connected to the terminal 37, there is displayed the PST program schedule data as shown in FIG. 4. Of the displayed program schedule data, the left-hand portion is the data which is changed from the CST program schedule data to the PST program schedule data at step 103.

If the switch 75 is turned on once again, the video signal for the program schedule data from the CRT controller 72 is blanked and the blanking of the signal Sy in the gate circuit 35 is released, and thus the normal satellite broadcast is received (displayed).

Furthermore, if the switch 76 is connected to the M, C, or E position corresponding to the Standard Time areas of MST, CST, or EST, following the step 102, step 106 and step 107, or step 108 and step 109, are executed so that with the CMT program schedule data, the data indicative of time is changed to the MST or EST. In this case, if the switch 76 is connected to the C position, the program at step 104 is directly executed so that the data is sequentially written in the memory 73. Therefore, the MST, CST, or EST program schedule data can be displayed selectively.

According to the second embodiment of the present invention, the broadcasting station does not have to prepare a plurality of local program schedules and to transmit them.

As described hereinabove, also in accordance with the second embodiment of this invention, since the Standard Time program schedule data can be displayed by only changing the position of switch 76 in response to the Standard Time, it becomes possible to eliminate any problems wherein the viewer will fail to see the desired television program because he sees the wrong calculation of the broadcasting time.

The above description is based on the preferred embodiments of the invention, but it will be apparent that many modifications and variations could be effected by one skilled in the art without departing from the spirit or scope of the novel concepts of the invention.

We claim as our invention:

1. A television signal receiving apparatus having a program schedule display function, comprising:
   tuner means;
   television signal processing means connected to said tuner means;
   digital signal processing means and associated switch means connected to said tuner means for generating a local program schedule display signal based on program schedule data obtained through said tuner means; and
   said switch means being switchable between at least two time zones, and said digital signal processing means providing said local program schedule display signal with times based on a time zone selected with said switch means.

2. A television signal receiving apparatus as claimed in claim 1 wherein said switch means selects one of a plurality of different types of program schedule data for different Standard Times obtained from said tuner means.

3. A television signal receiving apparatus having a program schedule display function, comprising:
   tuner means;
   television signal processing means connected to said tuner means;
   digital signal processing means and associated switch means connected to said tuner means for generating a local program schedule display signal based on program schedule data obtained through said tuner means;
   said switch means connected to said digital signal processing means selectively generating said local program schedule display signal based on a Standard Time selected by said switch means; and
   said digital signal processing means including time schedule conversion means which changes time data included in the program schedule data to a selected one of a plurality of Standard Times.

4. A television signal receiving apparatus according to claim 1 wherein said television signal processing means includes de-scrambling means, and scrambled television signals obtained from said tuner means are supplied to said de-scrambling means.

5. A television signal receiving apparatus according to claim 4 wherein said digital signal processing means generates a Standard Times display signal based on the Standard Time selected by said switch means.

6. A television signal program schedule display system, comprising:
   a tuner means;
   television signal processing means connected to said tuner means;
   processing means and associated switch means connected to said tuner means for generating a local program schedule display signal based on program schedule data obtained from said tuner means; and
   said switch means being switchable between at least two time zones and, depending upon the time zone selected, said digital signal processing means creating said local program schedule display signal based on said time zone selected.

7. A system according to claim 6 wherein said tuner means receives program schedule data based on a first of said at least two time zones, and said digital signal processing means includes conversion means for converting program schedule data containing data relating to the first time zone to data relating to the second time zone when said switch means is in said second time zone position.

* * * * *